United States Patent [19]

Takeo et al.

[11] Patent Number: 5,042,074
[45] Date of Patent: Aug. 20, 1991

[54] METHOD FOR DETERMINING SUBDIVISION PATTERNS OF RADIATION IMAGES

[75] Inventors: Hideya Takeo; Kazuhiro Hishinuma, both of Kanagawa, Japan

[73] Assignee: Fuji Photo Film Co., Ltd., Kanagawa, Japan

[21] Appl. No.: 499,736

[22] Filed: Mar. 27, 1990

[30] Foreign Application Priority Data

Apr. 14, 1989 [JP] Japan .................................. 1-94906

[51] Int. Cl.⁵ .............................................. G06K 9/34
[52] U.S. Cl. ...................................... 382/9; 250/327.2; 382/48
[58] Field of Search ........................ 382/9, 34, 48, 61; 250/327.2

[56] References Cited

U.S. PATENT DOCUMENTS

| | | | |
|---|---|---|---|
| 4,258,264 | 3/1981 | Kotera et al. | 250/484 |
| 4,276,473 | 6/1981 | Kato et al. | 250/327.1 |
| 4,315,318 | 2/1982 | Kato et al. | 364/515 |
| 4,387,428 | 6/1983 | Ishida et al. | 364/515 |
| 4,527,060 | 7/1985 | Suzuki et al. | 250/327.2 |
| 4,817,169 | 3/1989 | Peppors et al. | 382/9 |
| 4,829,181 | 5/1989 | Shimura | 250/327.2 |
| 4,896,038 | 1/1990 | Nakajima | 250/327.2 |

FOREIGN PATENT DOCUMENTS

56-11395 2/1981 Japan .

Primary Examiner—Leo H. Boudreau
Assistant Examiner—Steven Klocinski
Attorney, Agent, or Firm—Sughrue, Mion, Zinn Macpeak & Seas

[57] ABSTRACT

An image signal representing radiation images is detected from a recording medium on which the radiation images have been recorded in a subdivision pattern. The whole image recording area of the recording medium is divided into four regions which have the same shape and the same size and which are vertically and horizontally adjacent to one another. Calculations are made from the image signal in order to find characteristic amounts which represent resemblances in image between the divided regions which are vertically adjacent to each other and between the divided regions which are horizontally adjacent to each other. The subdivision pattern of the radiation images is determined by judging that the divided regions which are found as resembling each other in image are the subdivisions into which the whole recording area of the recording medium was divided when the radiation images were recorded thereon.

9 Claims, 3 Drawing Sheets

METHOD FOR DETERMINING SUBDIVISION PATTERNS OF RADIATION IMAGES

BACKGROUND OF THE INVENTION

1. Field of the Invention

This invention relates to a method for determining a subdivision pattern of radiation images which have been recorded on a recording medium, such as a stimulable phosphor sheet or an X-ray film.

2. Description of the Prior Art

Techniques for reading out a recorded radiation image in order to obtain an image signal, carrying out appropriate image processing on the image signal, and then reproducing a visible image by use of the processed image signal have heretofore been known in various fields. For example, as disclosed in Japanese Patent Publication No. 61(1986)-5193, an X-ray image is recorded on an X-ray film having a small gamma value chosen according to the type of image processing to be carried out, the X-ray image is read out from the X-ray film and converted into an electric signal, and the electric signal (image signal) is processed and then used for reproducing the X-ray image as a visible image on a copy photograph or the like. In this manner, a visible image having good image quality with high contrast, high sharpness, high graininess, or the like can be reproduced.

Also, when certain kinds of phosphors are exposed to radiation such as X-rays, α-rays, β-rays, γ-rays, cathode rays or ultraviolet rays, they store part of the energy of the radiation. Then, when the phosphor which has been exposed to the radiation is exposed to stimulating rays such as visible light, light is emitted by the phosphor in proportion to the amount of energy stored thereon during its exposure to the radiation. A phosphor exhibiting such properties is referred to as a stimulable phosphor. As disclosed in U.S. Pat. Nos. 4,258,264, 4,276,473, 4,315,318, 4,387,428, and Japanese Unexamined Patent Publication No. 56(1981)-11395, it has been proposed to use stimulable phosphors in radiation image recording and reproducing systems. Specifically, a sheet provided with a layer of the stimulable phosphor (hereinafter referred to as a stimulable phosphor sheet) is first exposed to radiation which has passed through an object such as the human body in order to store a radiation image of the object thereon, and is then scanned with stimulating rays, such as a laser beam, which cause it to emit light in proportion to the amount of energy stored during exposure to the radiation. The light emitted by the stimulable phosphor sheet, upon stimulation thereof, is photoelectrically detected and converted into an electric image signal. The image signal is then used to reproduce the radiation image of the object as a visible image on a recording material such as photographic film, on a display device such as a cathode ray tube (CRT), or the like.

Radiation image recording and reproducing systems which use stimulable phosphor sheets are advantageous over conventional radiography using silver halide photographic materials, in that images can be recorded even when the energy intensity of the radiation to which the stimulable phosphor sheet is exposed varies over a wide range. More specifically, since the amount of light which the stimulable phosphor sheet emits when being stimulated varies over a wide range and is proportional to the amount of energy stored thereon during its exposure toe the radiation, it is possible to obtain an image having a desirable density regardless of the energy intensity of the radiation to which the stimulable phosphor sheet was exposed. In order to obtain the desired image density, an appropriate red-out gain is set when the emitted light is being detected and converted into an electric signal to be used in the reproduction of a visible image on a recording material, such as photographic film, or an display device, such as a CRT.

In order for an image signal to be detected accurately, certain factors which affect the image signal must be set in accordance with the dose of radiation delivered to the stimulable phosphor sheet and the like. Novel radiation image recording and reproducing systems which accurately detect an image signal have been proposed in, for example, U.S. Pat. No. 4,527,060. The proposed radiation image recording and reproducing systems are constituted such that a preliminary read-out operation (hereinafter simply referred to as the "preliminary readout") is carried out in order approximately to ascertain the radiation image stored on the stimulable phosphor sheet. In the preliminary readout, the stimulable phosphor sheet is scanned with a light beam having a comparatively low energy level, and a preliminary read-out image signal obtained during the preliminary readout is analyzed. Thereafter, a final read-out operation (hereinafter simply referred to as the "final readout") is carried out to obtain the image signal, which is to be used during the reproduction of a visible image. In the final readout, the stimulable phosphor sheet is scanned with a light beam having an energy level higher than the energy level of the light beam used int eh preliminary readout, and the radiation image is read out with the factors affecting the image signal adjusted to appropriate values on the basis of the results of an analysis of the preliminary read-out image signal.

The term "read-out conditions" as used hereinafter means a group of various factors, which are adjustable and which affect the relationship between the amount of light emitted by the stimulable phosphor sheet during image readout and the output of a read-out means. For example, the term "read-out conditions" may refer to a read-out gain and a scale factor which define the relationship between the input to the read-out means and the output therefrom, or to the power of the stimulating rays used when the radiation image is read out.

The term "energy level of a light beam" as used herein means the level of energy of the light beam to which the stimulable phosphor sheet is exposed per unit area. In cases where the energy of the light emitted by the stimulable phosphor sheet depends on the wavelength of the irradiated light beam, i.e. the sensitivity of the stimulable phosphor sheet to the irradiated light beam depends upon the wavelength of the irradiated light beam, the term "energy level of a light beam" means the weighted energy level which is calculated by weighting the energy level of the light beam, to which the stimulable phosphor sheet is exposed per unit area, with the sensitivity of the stimulable phosphor sheet to the wavelength. In order to change the energy level of a light beam, light beams of different wavelengths may be used, the intensity of the light beam produced by a laser beam source or the like may be changed, or the intensity of the light beam may be changed by moving an ND filter or the like into and out of the optical path of the light beam. Alternatively, the diameter of the light beam may be changed in order to alter the scanning density, or the speed at which the stimulable phosphor sheet is scanned with the light beam may be changed.

Regardless of whether the preliminary readout is or is not carried out, it has also been proposed to analyze the image signal (including the preliminary read-out image signal) obtained and to adjust the image processing conditions, which are to be used when the image signal is processed, on the basis of the results of an analysis of the image signal. The proposed method is applicable to cases where an image signal is obtained from a radiation image recorded on a recording medium such as conventional X-ray film, as well as to systems using stimulable phosphor sheets.

Also, in the course of recording a radiation image, it is often desirable for portions of the object not related to a diagnosis or the like to be prevented from being exposed to radiation. Further, when the object portions not related to a diagnosis or the like are exposed to radiation, the radiation is scattered by such portions to the portion that is related to a diagnosis or the like, and the image quality is adversely affected by the scattered radiation. Therefore, when a radiation image is recorded on the recording medium, an irradiation field stop is often used to limit the irradiation field to an are smaller than the overall recording region of the recording medium so that radiation is irradiated only to that portion of the object, which is to be viewed, and part of the recording medium. In cases where the read-out conditions for the final readout and/or the image processing conditions are calculated on the basis of the results of an analysis of the image signal in the manner described above and the image signal is detected from a recording medium, on which the irradiation field was limited during the recording of the radiation image, the radiation image cannot be ascertained accurately if the image signal is analyzed without the shape and location of the irradiation field being taken into consideration. As a result, incorrect read-out conditions and/or an incorrect image processing conditions are set, and it becomes impossible to reproduce a visible radiation image which has good image quality and can serve as an effective tool in, particularly, the efficient and accurate diagnosis of an illness. In order to eliminate the aforesaid problem, it is necessary to determine the shape and location of an irradiation field and then to calculate the read-out conditions for the final readout and/or the image processing conditions on the basis of only the image signal representing image information stored in the region inside of the irradiation field.

In the aforesaid radiation image recording and reproducing systems, a subdivision image recording operation is often carried out wherein the whole recording area of a single recording medium (such as a stimulable phosphor sheet or X-ray film) is divided into a plurality of regions and different radiation images are recorded in the divided regions, one in each region. With the subdivision image recording operation, in cases where, for example, radiation images of objects smaller than the area of a recording medium are recorded, a plurality of images can be recorded on a single recording medium. Therefore, the subdivision image recording operation is advantageous from the viewpoint of economy. Also, a plurality of radiation images recorded on a single recording medium can be read out by a single image read-out operation. Therefore, the speed with which radiation images are read out can be kept high.

However, each of radiation images recorded in a plurality of divided regions of a recording medium during the subdivision image recording operation comprises an image of an object, and a background region upon which radiation impinged directly without passing through the object. In cases where an irradiation field stop was used during the recording of the radiation image, the radiation image also comprises a scattered radiation image region upon which scattered radiation impinged and which is present in the region outside of the irradiation field. When the radiation images are reproduced as visible images on a photographic material or the like, only the object images need to be reproduced as visible images which have good image quality and can serve as an effective tool in, particularly, the efficient and accurate diagnosis of an illness. Therefore, when the read-out conditions for the final readout and/or the image processing conditions are determined, it is necessary to extract only image signal components corresponding to the object images from an image signal representing the total radiation images. If the subdivision pattern on the recording medium is not determined but an image signal is detected from the recording medium on the assumption that only a single radiation image is recorded on the recording medium, it will become impossible to discriminate image signal components corresponding to the object images, the background regions, and the scattered radiation image regions of the radiation images from one another. Therefore, the image signal components corresponding to the object images cannot be extracted accurately from the image signal representing the whole radiation images.

The problems described above can be eliminated by recording the information about a subdivision pattern employed during the recording of radiation images, and manually entering the information about the subdivision pattern into the radiation image recording and reproducing system, for example, before an image signal is detected from the recording medium. However, considerable labor is required to record the information about the subdivision pattern and to enter it into the radiation image recording and reproducing system. Also, there is the risk that incorrect information about the subdivision pattern is entered into the radiation image recording and reproducing system.

SUMMARY OF THE INVENTION

The primary object of the present invention is to provide a method for automatically and easily determining a subdivision pattern of radiation images.

Another object of the present invention is to provide a method for automatically determining a subdivision pattern of radiation images, which enables the read-out conditions for the final readout and/or the image processing conditions to be determined accurately.

The present invention provides a method for determining a subdivision pattern of radiation images, which comprises the steps of:

i) detecting an image signal made up of a series of image signal components representing radiation images from a recording medium (such as a stimulable phosphor sheet or an X-ray film) on which the radiation images have been recorded, ii) dividing the whole image recording area of said recording medium into four regions which have the same shape and the same size and which are vertically and horizontally adjacent to one another, iii) from said image signal, calculating characteristic amounts which represent resemblances in image between the divided regions which are vertically adjacent to each other and between the divided regions which are horizontally adjacent to each other, iv) judging that the divided regions which are associated with the characteristic amount representing a resemblance in image higher than a predetermined level resemble each other in image, v) in cases where it is judged that only the divided regions which are horizontally adjacent to each other resemble each other in image, determining that the subdivision pattern of the radiation images, which was used during the recording of the radiation images on said recording medium, is a two-on-one subdivision pattern having two radiation images which are horizontally adjacent to each other, vi) in cases where it is judged that only the divided regions which are vertically adjacent to each other resemble each other in image, determining that the subdivision pattern of the radiation images, which was used during the recording of the radiation images on said recording medium, is a two-on-one subdivision pattern having two radiation images which are vertically adjacent to each other, and vii) in cases where it is judged that all the four divided regions resemble one another in image, determining that the subdivision pattern of the radiation images, which was used during the recording of the radiation images on said recording medium, is a four-on-one subdivision pattern having four radiation images which are vertically and horizontally adjacent to each other.

The characteristic amount representing the resemblance in image may be calculated with one of various mathematical methods. For example, the characteristic amount may be calculated from the square values of differences between the image signal components which represent corresponding picture elements located in the divided regions adjacent to each other. Alternatively, the characteristic amount may be calculated from the absolute values of differences between said image signal components. As another alternative, the coefficient of correlation between said image signal components may be employed as the characteristic amount.

The present invention is based on the findings that, in cases where radiation images are recorded on a recording medium with the subdivision image recording operation, there is a resemblance between the radiation images. Accordingly, a subdivision pattern of the radiation images, which was used during the recording of the radiation images on a recording medium, is determined by investigating the resemblance in image between adjacent divided regions among the four divided regions, and judging that the divided regions resembling each other in image are the subdivisions into which the whole recording area of the recording medium was divided when the radiation images were recorded thereon.

With the method for determining a subdivision pattern of radiation images in accordance with the present invention, a subdivision pattern of the radiation images, which was used during the recording of the radiation images on a recording medium, can be determined easily and automatically. Therefore, the image signal components corresponding to the object images recorded in the subdivisions on the recording medium can be extracted accurately from the image signal detected from the whole area of the recording medium, and the read-out conditions for the final readout and/or the image processing conditions can be set accurately based on the extracted image signal components.

DESCRIPTION OF THE PREFERRED EMBODIMENTS

The present invention will hereinbelow be described in further detail with reference to the accompanying drawings.

Figure 1:
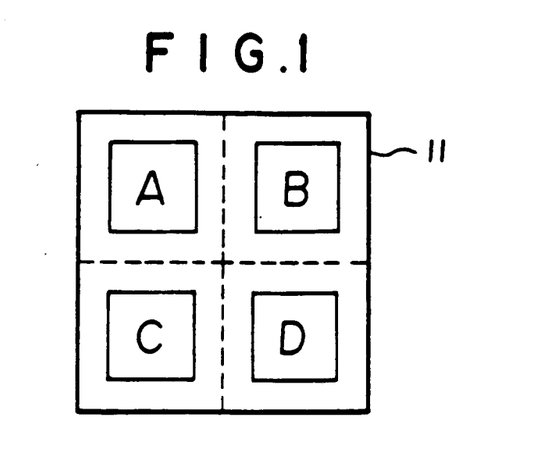
FIG. 1 is an explanatory view showing how the image recording area of a recording medium is divided into four regions with an embodiment of the method for determining a subdivision pattern of radiation images in accordance with the present invention.

FIG. 1 shows four regions into which the whole image recording area of a recording medium 11 is divided in order to determine a subdivision pattern of radiation images which was used during the recording of radiation images on the recording medium 11. The four divided regions are vertically and horizontally adjacent to one another. In this example, the square recording medium 11 is divided into square regions A, B, C, and D which have the same shape and the same size. From an image signal detected from the recording medium 11, characteristic amounts are calculated which represent resemblances in image between the divided regions which are vertically adjacent to each other, i.e. between the divided regions A and C and between the divided regions B and D. Also, characteristic amounts are calculated which represent resemblances in image between the divided regions which are horizontally adjacent to each other, i.e. between the divided regions A and B and between the divided regions C and D.

In cases where only the resemblances in image between the divided regions which are horizontally adjacent to each other, i.e. between the divided regions A and B and between the divided regions C and D, are high, it is determined that the subdivision pattern of the radiation images, which was used during the recording of the radiation images on the recording medium 11, is a two-on-one subdivision pattern having two radiation images which are horizontally adjacent to each other. In cases where only the resemblances in image between the divided regions which are vertically adjacent to each other, i.e. between the divided regions A and C and between the divided regions B and D, are high, it is determined that the subdivision pattern of the radiation images, which was used during the recording of the radiation images on the recording medium 11, is a two-on-one subdivision pattern having two radiation images which are vertically adjacent to each other. In cases where all the resemblances in image between the four divided regions A, B, C, and D are high, it is determined that the subdivision pattern of the radiation images, which was used during the recording of the radiation images on the recording medium 11, is a four-on-one subdivision pattern having four radiation images which are vertically and horizontally adjacent to each other.

Figure 2A:
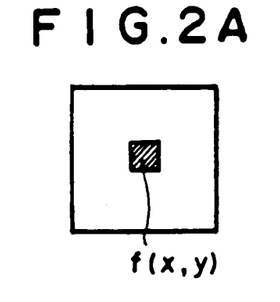
FIG. 2 is an explanatory view showing the picture elements located in divided regions adjacent to each other on the recording medium.
Figure 2B:
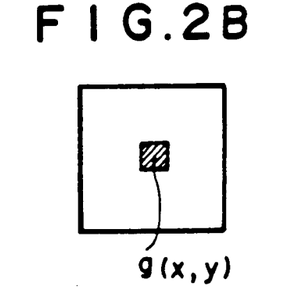

The resemblance in image can be quantitatively determined from the characteristic amount. By way of example, as shown in FIG. 2, the image signal components which represent corresponding picture elements located in two divided regions which are to be compared with each other are represented by f(x,y) and g(x,y). The characteristic amount may be calculated from the square values of differences between the image signal components f(x,y) and g(x,y), i.e. from the formula expressed as $$\Sigma\Sigma(f(x,y)-g(x,y))^2 \tag{1}$$

Alternatively, the characteristic amount may be calculated from the absolute values of differences between the image signal components f(x,y) and g(x,y), i.e. from the formula expressed as $$\Sigma\Sigma|f(x,y)-g(x,y)| \tag{2}$$

As another alternative, the coefficient of correlation between the image signal components f(x,y) and g(x,y) expressed as $$\gamma = \frac{\Sigma\Sigma f(x,y)g(x,y)}{\sqrt{\Sigma\Sigma f(x,y)^2}\sqrt{\Sigma\Sigma g(x,y)^2}} \tag{3}$$

may be employed as the characteristic amount. The two divided regions are judged as resembling each other in image when the characteristic amount calculated from Formula (1) or (2) is smaller than a predetermined value or when the characteristic amount calculated from Formula (3) is larger than a predetermined value.

In the process for calculating the characteristic amount, it may occur that the positions of the corresponding picture elements located in two divided regions, which are to be compared with each other, deviate slightly from each other. In order to cope with this problem, positions of two picture elements which are respectively located in the two divided regions and which are closest to each other may be found from neighboring picture elements, and the two picture elements thus found may be taken as the corresponding picture elements.

As the image signal, the original image signal which was detected from the recording medium may be used directly. Alternatively, the original image signal may be converted into a binary image signal from an operation using an appropriate threshold value, and the binary image signal may be used as the aforesaid image signal. When the binary image signal is used, the characteristic amount can be calculated more easily.

How a subdivision pattern of radiation images, which was used during the recording of the radiation images on a recording medium, is determined with the method for determining a subdivision pattern of radiation images in accordance with the present invention will be described hereinbelow.

Figure 3:
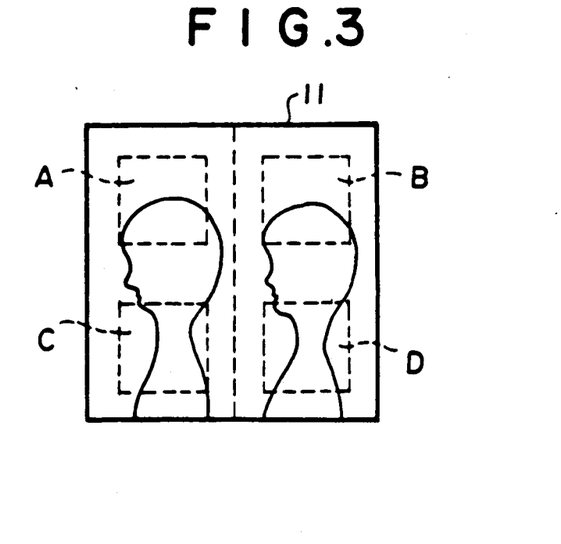
FIG. 3 is an explanatory view showing an example of the subdivision pattern in which the image recording area of a single recording medium is divided into two subdivisions horizontally adjacent to each other and radiation images are recorded in the two subdivisions.

FIG. 3 shows an example of the subdivision pattern in which the image recording area of a single recording medium 11 is divided into two subdivisions horizontally adjacent to each other and radiation images are recorded in the two subdivisions. In this example, two radiation images of the upper parts of human bodies are recorded on the recording medium 11 such that they are horizontally adjacent to each other. During the determination of the subdivision pattern, the whole image recording region of the recording medium 11 is divided into four regions A, B, C, and D. As will be clear from FIG. 3, the divided regions A and B which are horizontally adjacent to each other resemble each other in image. Also, the divided regions C and D which are horizontally adjacent to each other resemble each other in image. Therefore, the subdivision pattern can be determined as being a two-on-one subdivision pattern having two radiation images which are horizontally adjacent to each other.

Figure 4:
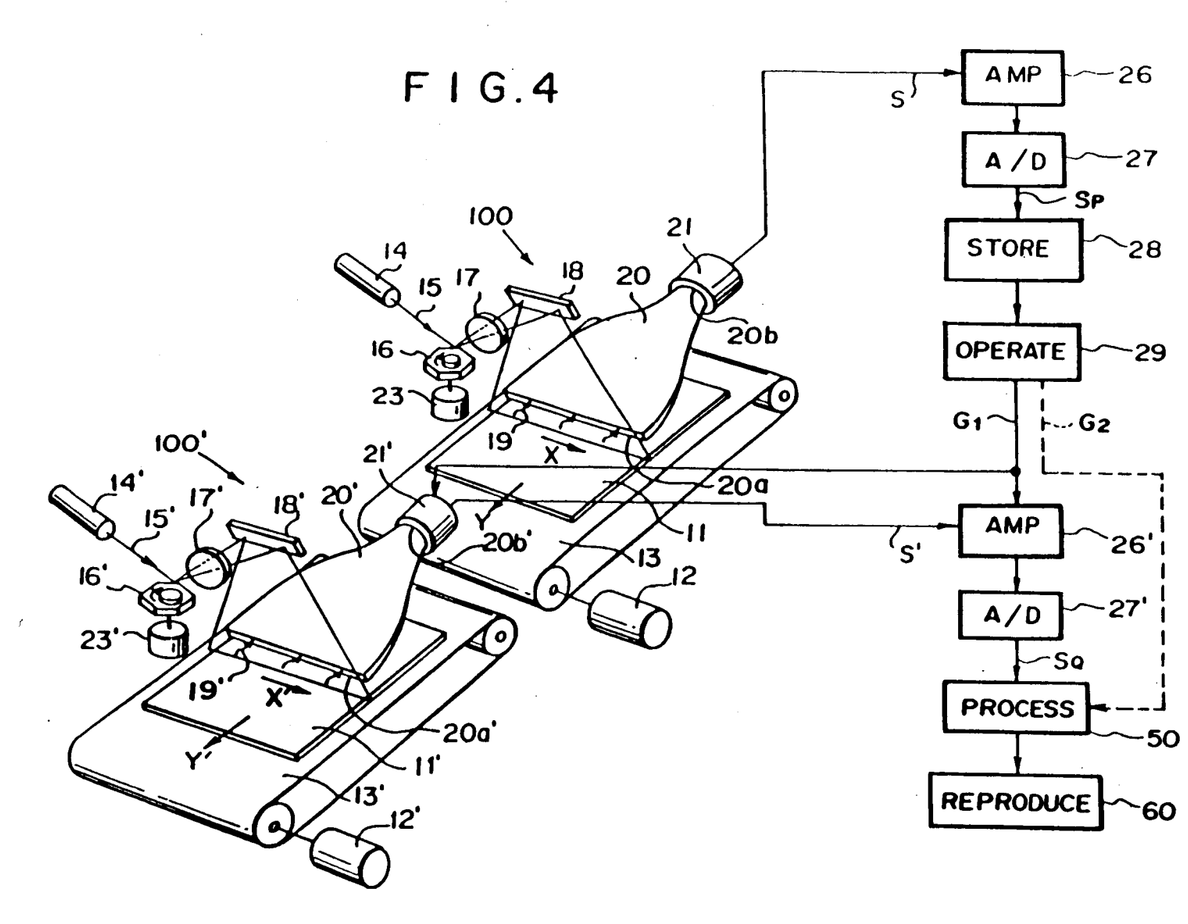
FIG. 4 is a perspective view showing an example of the radiation image read-out apparatus wherein an embodiment of the method for determining a subdivision pattern of radiation images in accordance with the present invention is employed.

FIG. 4 is a perspective view showing an example of the radiation image read-out apparatus wherein an embodiment of the method for determining a subdivision pattern of radiation images in accordance with the present invention is employed. In this embodiment, by way of example, radiation images recorded on a stimulable phosphor sheet 11 are read out, and a preliminary read-out is carried out.

The stimulable phosphor sheet 11 on which the radiation images have been stored is placed at a predetermined position in a preliminary read-out means 100 which carries out a preliminary readout by scanning the stimulable phosphor sheet 11 with a light beam having a low energy level, thereby releasing only part of the energy from the stimulable phosphor sheet 11, which energy was stored during its exposure to radiation. The stimulable phosphor sheet 11 is conveyed in a sub-scanning direction indicated by the arrow Y by a sheet conveyance means 13 which is constituted of an endless belt or the like and which is operated by a motor 12. A laser beam 15 which has a low energy level is produced by a laser beam source 14, and is reflected and deflected by a rotating polygon mirror 16 which is quickly rotated by a motor 23 in the direction indicated by the arrow. The laser beam 15 then passes through a converging lens 17 constituted of an fθ lens or the like. The direction of the optical path of the laser beam 15 is then changed by a mirror 18, and the laser beam 15 impinges upon the stimulable phosphor sheet 11 and scans it in a main scanning direction indicated by the arrow X, which direction is approximately normal to the sub-scanning direction indicated by the arrow Y. When the stimulable phosphor sheet 11 is exposed to the laser beam 15, the exposed portion of the stimulable phosphor sheet 11 emits light 19 in an amount proportional to the amount of energy stored thereon during its exposure to radiation. The emitted light 19 is guided by a light guide member 20 and photoelectrically detected by a photomultiplier 21. The light guide member 20 is made from a light guiding material such as an acrylic plate and has a linear light input face 20a, positioned so that it extends along the main scanning line on the stimulable phosphor sheet 11, and a ring-shaped light output face 20b, positioned so that it is in close contact with a light receiving face of the photomultiplier 21. The emitted light 19, which has entered the light guide member 20 at its light input face 20a, is guided through repeated total reflection inside of the light guide member 20, emanates from the light output face 20b, and is received by the photomultiplier 21. In this manner, the amount of the emitted light 19, which amount represents the radiation images, is converted into an electric signal by the photomultiplier 21.

An analog output signal S generated by the photomultiplier 21 is logarithmically amplified by a logarithmic amplifier 26, and digitized by an A/D converter 27 into a preliminary read-out image signal SP. The preliminary read-out image signal SP takes a value proportional to the logarithmic value of the amount of the emitted light 19.

In the preliminary readout, read-out conditions, such as the voltage applied to the photomultiplier 21 or the amplification factor of the logarithmic amplifier 26, are adjusted so that image information can be detected accurately even if the amount of energy stored on the stimulable phosphor sheet 11 during its exposure to radiation varies over a wide range.

The preliminary read-out image signal SP obtained in the manner described above is fed into a storage means 28 and stored therein. Thereafter, the preliminary read-out image signal SP is read from the storage means 28, and fed into an operation means 29. Based on the preliminary read-out image signal SP, the operation means 29 detects the subdivision pattern in cases where the recording area of the stimulable phosphor sheet 11 was divided into a plurality of subdivisions and the recording of a radiation image was carried out for each of the subdivisions. The subdivision pattern is detected with the aforesaid method for determining a subdivision pattern of radiation images in accordance with the present invention. Thereafter, the operation means 29 calculates the read-out conditions suitable for the respective subdivisions, and calculates mean values of these read-out conditions. In this manner, the operation means 29 sets the read-out conditions G1 for the final readout, such as the voltage to be applied to a photomultiplier 21' or the amplification factor to be set in a logarithmic amplifier 26'.

A stimulable phosphor sheet 11' on which the preliminary readout has been finished is placed at a predetermined position in the final read-out means 100' and scanned with a laser beam 15' having an energy level higher than that of the laser beam 15 used during the preliminary readout. In this manner, an image signal is detected under the read-out conditions G1 which have been set in the manner described above. The configuration of the final read-out means 100' is nearly the same as that of the preliminary read-out means 100, and therefore elements corresponding to those constituting the preliminary read-out means 100 are numbered with corresponding primed reference numerals in FIG. 4.

After the image signal is digitized in an A/D converter 27', the resulting image signal SQ is fed into an image processing means 50, which carries out appropriate image processing on the image signal SQ. After being image processed, the image signal is fed into a reproducing apparatus 60, which reproduces a visible image by use of the image signal.

In order to detect the subdivision pattern, the operation means 29 divides the whole image recording area of the stimulable phosphor sheet 11 into four regions which have the same shape and the same size and which are vertically and horizontally adjacent to one another as shown in FIG. 1. Thereafter, from the preliminary read-out image signal SP, the operation means 29 calculates characteristic amounts which represent resemblances in image between the divided regions which are vertically adjacent to each other and between the divided regions which are horizontally adjacent to each other. The operation means 29 judges that the divided regions which are associated with the characteristic amount representing a resemblance in image higher than a predetermined level resemble each other in image. In this manner, the subdivision pattern is determined.

After the subdivision pattern is determined in the manner described above, the image signal components corresponding to the object image in the radiation image stored in each subdivision are extracted from the preliminary read-out image signal SP representing the radiation image. On the basis of the extracted image signal components, the read-out conditions which are suitable for each subdivision are calculated.

In the apparatus of FIG. 4, even though a plurality of radiation images were stored on a single stimulable phosphor sheet 11, the read-out conditions for the final readout cannot be changed for each of the radiation images. Therefore, in this apparatus, after the read-out conditions suitable for the respective subdivisions are calculated, the mean values of the read-out conditions are calculated and set as the final read-out conditions G1 for the final readout.

In the aforesaid embodiment, the read-out conditions G1 for the final readout are set by the operation means 29. Alternatively, predetermined readout conditions may be used when the final readout is carried out regardless of the characteristics of the preliminary read-out image signal SP. On the basis of the preliminary read-out image signal SP, the operation means 29 may calculate image processing conditions G2 to be used in the image processing means 50 which carries out image processing of the image signal SQ. The image processing conditions G2 calculated by the operation means 29 may then be fed into the image processing means 50 as indicated by the broken line in FIG. 4. The operation means 29 may also determine both the read-out conditions and the image processing conditions.

In the embodiment of FIG. 4, the preliminary read-out means 100 and the final read-out means 100' are separate from each other. Alternatively, because the configurations of the preliminary read-out means 100 and the final read-out means 100' are approximately identical to each other, a single read-out means may be utilized for performing both the preliminary readout and the final readout. In this case, after being subjected to the preliminary readout, the stimulable phosphor sheet 11 may be moved back to the position at which image readout is started. Thereafter, the final readout may be carried out.

In cases where a single read-out means is utilized to perform both the preliminary readout and the final readout, it is necessary to change the intensity of the light beam used in the preliminary readout and the final readout. For this purpose, various methods may be employed as described above; for example, a laser beam source or the like may change the intensity of the light beam.

The aforesaid embodiment is applied to radiation image read-out apparatuses wherein a preliminary readout is carried out. However, the method for determining a subdivision pattern of radiation images in accordance with the present invention is also applicable to radiation image read-out apparatuses wherein no preliminary read-out operation is carried out, but wherein only a read-out operation corresponding to the final read-out operation is carried out. In these cases, an image signal is obtained by use of predetermined read-out conditions. Based on the image signal, the subdivision pattern of radiation images is determined and the image processing conditions are calculated by an operation means. The calculated image processing conditions are then taken into consideration when the image signal is processed.

The method for determining a subdivision pattern of radiation images in accordance with the present invention is not limited to the aforesaid embodiment wherein a stimulable phosphor sheet is used, and is also applicable to, for example, an X ray image read-out apparatus wherein conventional X-ray film is used.

Figure 5:
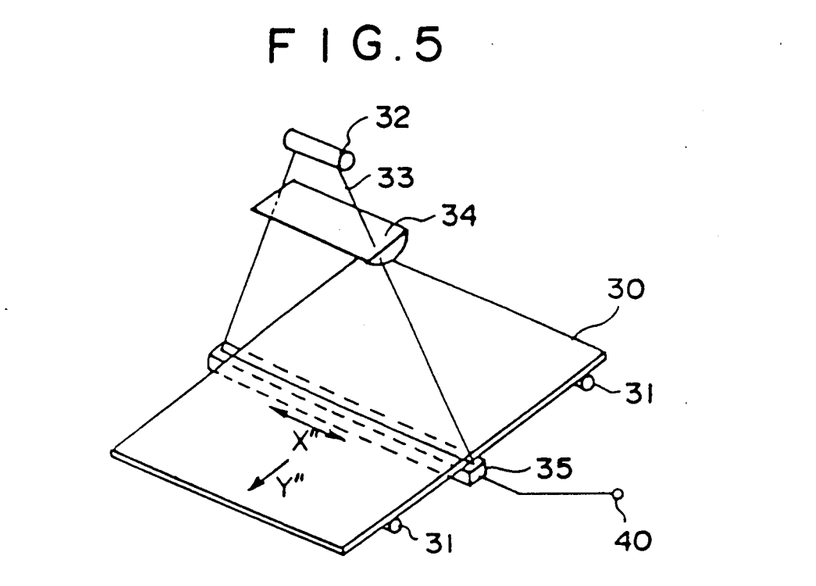
FIG. 5 is a perspective view showing an example of an X-ray image read-out apparatus wherein an X-ray image recorded on an X-ray film is read out.

FIG. 5 is a perspective view showing an example of an X ray image read-out apparatus wherein X-ray images recorded on an X-ray film are read out.

With reference to FIG. 5, a sheet of X-ray film 30, on which X ray images have been recorded, is placed at a predetermined position and is conveyed in the direction indicated by the arrow Y" by a film conveyance means 31.

Reading light 33, which is produced by an elongated light source 32 extending in one direction, is converged by a cylindrical lens 34 and is linearly irradiated onto the X-ray film 30 along the directions indicated by the double-headed arrow X", which are approximately normal to the direction indicated by the arrow Y". A MOS sensor 35 is positioned below the X-ray film 30 so that the MOS sensor 35 can receive the reading light 33 which has passed through the X-ray film 30, the intensity of which light has been modulated in accordance with the X-ray images recorded on the X-ray film 30. The MOS sensor 35 comprises a plurality of solid state photoelectric conversion devices which are arrayed linearly at intervals equal to the intervals between the picture elements of the X-ray images along the directions indicated by the double-headed arrow X". As long as the X-ray film 30 is conveyed in the direction indicated by the arrow Y" while being exposed to the reading light 33, the MOS sensor 35 detects the reading light, which has passed through the X-ray film 30, at predetermined intervals corresponding to the intervals between the picture elements of the X-ray images along the direction indicated by the arrow Y".

Figure 6:
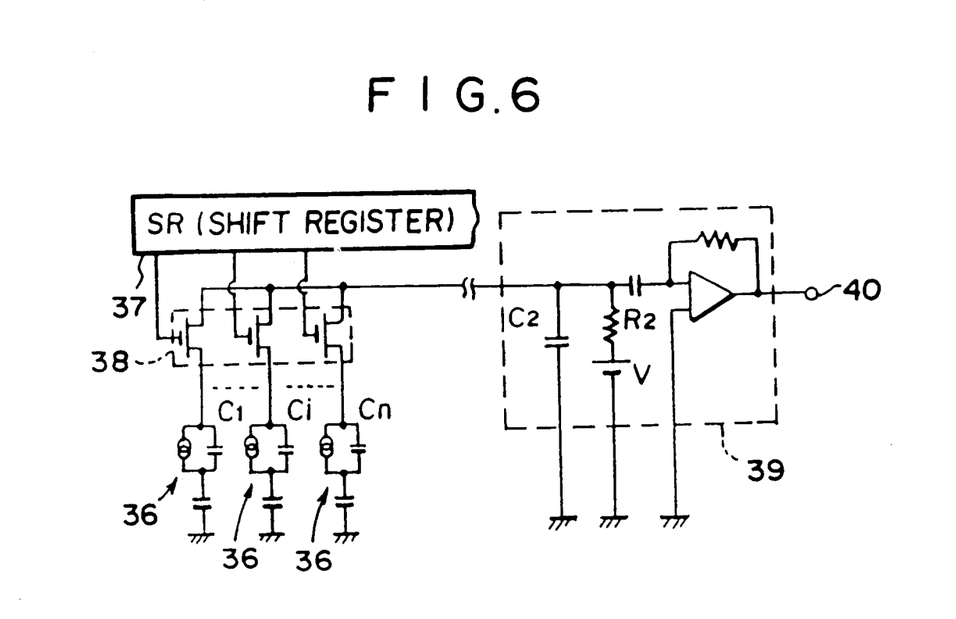
FIG. 6 is a circuit diagram showing an equivalent circuit for a MOS sensor.

FIG. 6 is a circuit diagram showing an equivalent circuit for the MOS sensor 35.

With reference to FIG. 6, photocarriers generated when the reading light 33 impinges upon the solid state photoelectric conversion devices 36, 36, ... accumulate in capacitors Ci (i=1, 2, ..., n) of the solid state photoelectric conversion devices 36, 36, ... The switches of a switch section 38 are turned on and off sequentially, which allows the number of photocarriers which have accumulated in the capacitors Ci to be detected. A shift register 37 controls the switches of the switch section 38, and a time-serial image signal is obtained. The image signal is then amplified by a preamplifier 39 and is output at an output terminal 40 of the pre-amplifier 39.

The analog image signal output by the MOS sensor 35 is sampled and digitized into an image signal. Thereafter, a subdivision pattern is detected in the same manner as in the aforesaid embodiment. In the embodiment shown in FIG. 5, the MOS sensor 35 may be replaced by a charge coupled device (CCD) or a charge priming device (CPD). Also, in order to read out the X-ray images from the X-ray film 30, the X-ray film 30 may be two-dimensionally scanned with a light beam in the same manner as that described above for image readout from a stimulable phosphor sheet. Furthermore, instead of light which has passed through the X-ray film 30 being detected, light reflected by the X-ray film 30 may be detected.

The method for determining a subdivision pattern of radiation images in accordance with the present invention is applicable widely when the whole image recording area of a recording medium is divided into a plurality of subdivisions and radiation images are recorded in the respective subdivisions.

We claim:

1. A method for determining a subdivision pattern of radiation images, which comprises the steps of:
    (i) detecting an image signal made up of a series of image signal components representing radiation images from a recording medium having an image recording area on which the radiation images have been recorded;
    (ii) dividing the image recording area of said recording medium into four regions so as to produce divided regions which have the same shape and the same size and which are vertically and horizontally adjacent to one another;
    (iii) from said image signal, calculating a plurality of characteristic amounts by comparing corresponding image signal components from at least two divided regions, which characteristic amounts represent resemblances in image between the divided regions which are vertically adjacent to each other and between the divided regions which are horizontally adjacent to each other;
    (iv) judging that the divided regions which are associated with one of the characteristic amounts, representing a resemblance in image higher than a predetermined level, resemble each other in image;
    (v) in cases where it is judged that only the divided regions which are horizontally adjacent to each other resemble each other in image, determining that the subdivision pattern of the radiation images, which was used during the recording of the radiation images on said recording medium, is a two-on-one subdivision pattern having two radiation images which are horizontally adjacent to each other;
    (vi) in cases where it is judged that only the divided regions which are vertically adjacent to each other resemble each other in image, determining that the subdivision pattern of the radiation images, which was used during the recording of the radiation images on said recording medium, is a two-on-one subdivision pattern having two radiation images which are vertically adjacent to each other; and
    (vii) in cases where it is judged that all the four divided regions resemble one another in image, determining that the subdivision pattern of the radiation images, which was used during the recording of the radiation images on said recording medium, is a four-on-one subdivision pattern having four radiation images which are vertically and horizontally adjacent to each other.

2. A method as defined in claim 1 wherein said characteristic amounts are calculated from squares of values of differences between the image signal components which represent corresponding picture elements located in the divided regions adjacent to each other.

3. A method as defined in claim 1 wherein said characteristic amounts are calculated from absolute values of differences between the image signal components which represent corresponding picture elements located in the divided regions adjacent to each other.

4. A method as defined in claim 1 wherein said characteristic amounts are coefficients of correlations between the image signal components which represent corresponding picture elements located in the divided regions adjacent to each other.

5. A method as defined in claim 1 wherein said recording medium is a stimulable phosphor sheet on which radiation images have been stored.

6. A method as defined in claim 5 wherein said image signal is obtained form a read-out operation wherein said stimulable phosphor sheet is exposed to stimulating rays which cause said stimulable phosphor sheet to emit light in proportion to an amount of energy stored thereon during exposure to radiation; and the light emitted in response to said stimulating rays is detected photoelectrically.

7. A method as defined in claim 6 wherein said read-out operation is a preliminary read-out operation which is carried out in order approximately to ascertain the radiation images stored on said stimulable phosphor sheet.

8. A method as defined in claim 6 wherein said stimulating rays are a laser beam.

9. A method as defined in claim 1 wherein said recording medium is photographic film.

* * * * *